(12) United States Patent
Merzhaeuser

(10) Patent No.: US 11,486,352 B2
(45) Date of Patent: Nov. 1, 2022

(54) SCARF CONNECTION FOR A WIND TURBINE ROTOR BLADE

(71) Applicant: General Electric Company, Schenectady, NY (US)

(72) Inventor: Thomas Merzhaeuser, Munich (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/289,943

(22) PCT Filed: Nov. 1, 2018

(86) PCT No.: PCT/US2018/058658
§ 371 (c)(1),
(2) Date: Apr. 29, 2021

(87) PCT Pub. No.: WO2020/091783
PCT Pub. Date: May 7, 2020

(65) Prior Publication Data
US 2022/0010766 A1    Jan. 13, 2022

(51) Int. Cl.
*F03D 1/06* (2006.01)
*B29C 65/00* (2006.01)
*B29L 31/08* (2006.01)

(52) U.S. Cl.
CPC ........ *F03D 1/0675* (2013.01); *B29C 66/1286* (2013.01); *B29L 2031/085* (2013.01);
(Continued)

(58) Field of Classification Search
CPC ................ F03D 1/0675; F03D 1/0683; F05B 2240/302; F05B 2280/6003; B29C 66/1286; B29L 2031/085
See application file for complete search history.

(56) References Cited

U.S. PATENT DOCUMENTS

| 851,196 A | 4/1907 | Bevans et al. |
| 4,474,536 A | 10/1984 | Gougeon et al. |
| (Continued) | | |

FOREIGN PATENT DOCUMENTS

| EP | 1603736 B1 | 8/2006 |
| EP | 2186622 A1 | 5/2010 |
| (Continued) | | |

OTHER PUBLICATIONS

PCT International Search Report & Opinion Corresponding to PCT/US2018/058658 dated Jul. 22, 2019.

*Primary Examiner* — Courtney D Heinle
*Assistant Examiner* — Sang K Kim
(74) *Attorney, Agent, or Firm* — Dority & Manning, P.A.

(57) ABSTRACT

A rotor blade for a wind turbine includes a first blade segment and a second blade segment extending in opposite directions from a chord-wise joint. Each of the first and second blade segments includes at least one shell member defining an airfoil surface and an internal support structure. The first blade segment includes a beam structure extending lengthwise that structurally connects with the second blade segment. Further, the beam structure forms a portion of the internal support structure of the first blade segment. Moreover, the beam structure is formed, at least in part, of a first portion constructed of a first composite material and a second portion constructed of a different, second composite material. Further, the first and second portions are connected together via a scarf joint. In addition, the scarf joint includes a different, third composite material arranged between the first and second composite materials.

14 Claims, 5 Drawing Sheets

(52) U.S. Cl.
CPC ..... *F05B 2240/302* (2013.01); *F05B 2260/30* (2013.01); *F05B 2280/6003* (2013.01)

(56) References Cited

U.S. PATENT DOCUMENTS

| | | | |
|---|---|---|---|
| 4,643,646 | A | 2/1987 | Hahn et al. |
| 4,732,542 | A | 3/1988 | Hahn et al. |
| 5,281,454 | A | 1/1994 | Hanson |
| 7,334,989 | B2 | 2/2008 | Arelt |
| 7,344,360 | B2 | 3/2008 | Wetzel |
| 7,521,105 | B2 * | 4/2009 | Bech ................ B29B 11/16 428/60 |
| 7,901,188 | B2 | 3/2011 | Llorente Gonzalez et al. |
| 7,922,454 | B1 | 4/2011 | Riddell |
| 7,927,077 | B2 | 4/2011 | Olson |
| 7,997,874 | B2 | 8/2011 | van der Bos |
| 7,998,303 | B2 | 8/2011 | Baehmann et al. |
| 8,123,488 | B2 | 2/2012 | Finnigan et al. |
| 8,221,085 | B2 * | 7/2012 | Livingston ........... B29C 66/54 416/226 |
| 8,297,932 | B2 | 10/2012 | Arocena De La Rua et al. |
| 8,348,622 | B2 | 1/2013 | Bech |
| 8,356,982 | B2 | 1/2013 | Petri Larrea et al. |
| 8,376,713 | B2 | 2/2013 | Kawasetsu et al. |
| 8,388,316 | B2 | 3/2013 | Arocena De La Rua et al. |
| 8,517,689 | B2 | 8/2013 | Kyriakides et al. |
| 8,919,754 | B2 | 12/2014 | Schibsbye |
| 9,394,881 | B2 * | 7/2016 | Obrecht ................ B23P 15/04 |
| 9,669,589 | B2 | 6/2017 | Zamora Rodriguez et al. |
| 9,920,630 | B2 * | 3/2018 | Dahl ................... F01D 5/147 |
| 10,961,982 | B2 * | 3/2021 | Broome ............... B29C 66/61 |
| 11,131,290 | B2 * | 9/2021 | Pal ..................... F03D 1/0683 |
| 2007/0018049 | A1 | 1/2007 | Stuhr |
| 2007/0253824 | A1 | 11/2007 | Eyb |
| 2008/0069699 | A1 | 3/2008 | Bech |
| 2009/0116962 | A1 | 5/2009 | Pedersen et al. |
| 2009/0155084 | A1 | 6/2009 | Livingston et al. |
| 2009/0162208 | A1 | 6/2009 | Zirin et al. |
| 2009/0242119 | A1 | 10/2009 | Bech et al. |
| 2010/0062238 | A1 * | 3/2010 | Doyle ................. B29C 70/02 428/295.1 |
| 2010/0132884 | A1 | 6/2010 | Baehmann et al. |
| 2010/0215494 | A1 | 8/2010 | Bech et al. |
| 2010/0275551 | A1 | 11/2010 | Hofmann et al. |
| 2010/0304170 | A1 | 12/2010 | Frederiksen |
| 2011/0052403 | A1 | 3/2011 | Kawasetsu et al. |
| 2011/0081247 | A1 | 4/2011 | Hibbard |
| 2011/0081248 | A1 | 4/2011 | Hibbard |
| 2011/0091326 | A1 | 4/2011 | Hancock |
| 2011/0158788 | A1 | 6/2011 | Bech et al. |
| 2011/0158806 | A1 | 6/2011 | Arms et al. |
| 2011/0229336 | A1 | 9/2011 | Richter et al. |
| 2012/0082554 | A1 | 4/2012 | Baker et al. |
| 2012/0093627 | A1 | 4/2012 | Christenson et al. |
| 2012/0196079 | A1 | 8/2012 | Brauers et al. |
| 2012/0213642 | A1 | 8/2012 | Wang et al. |
| 2012/0269643 | A1 | 10/2012 | Hibbard et al. |
| 2012/0308396 | A1 | 12/2012 | Hibbard |
| 2013/0040151 | A1 | 2/2013 | Jeromerajan et al. |
| 2013/0064663 | A1 | 3/2013 | Loth et al. |
| 2013/0129518 | A1 | 5/2013 | Hayden et al. |
| 2013/0164133 | A1 | 7/2013 | Grove-Nielsen |
| 2013/0177433 | A1 | 7/2013 | Fritz et al. |
| 2013/0189112 | A1 | 7/2013 | Hedges et al. |
| 2013/0189114 | A1 | 7/2013 | Jenzewski et al. |
| 2013/0219718 | A1 | 8/2013 | Busbey et al. |
| 2013/0224032 | A1 | 8/2013 | Busbey et al. |
| 2013/0236307 | A1 | 9/2013 | Stege |
| 2013/0236321 | A1 | 9/2013 | Olthoff |
| 2014/0286780 | A1 | 9/2014 | Lemos et al. |
| 2015/0204200 | A1 | 7/2015 | Eyb et al. |
| 2015/0369211 | A1 | 12/2015 | Merzhaeuser |
| 2016/0341177 | A1 | 11/2016 | Bech et al. |
| 2018/0298879 | A1 | 10/2018 | Johnson et al. |
| 2020/0298351 | A1 * | 9/2020 | Girolamo ............... B29C 73/10 |

FOREIGN PATENT DOCUMENTS

| | | |
|---|---|---|
| EP | 3144526 A1 | 3/2017 |
| FR | 2710871 A1 | 4/1995 |
| GB | 2477847 A | 8/2011 |
| WO | WO2004/078461 A1 | 9/2004 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |
| WO | WO2018/029240 A1 | 2/2018 |

* cited by examiner

SCARF CONNECTION FOR A WIND TURBINE ROTOR BLADE

FIELD

The present disclosure relates generally to wind turbines, and more particularly to a scarf connection for a rotor blade of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

When designing the internal structural components of the rotor blades, the optimum material with regard to strength, weight, E-modulus and cost etc. is often not the same as the rest of the components in the rotor blade. For example, in the spar caps, the preferred material for the majority of the component may be a glass fiber reinforced composite due to low cost and limited mechanical requirements. In contrast, the preferred material for the other portions of the component may be carbon fiber reinforced composite due to the higher stiffness and lower weight. The physical properties (e.g. stiffness and thermal expansion) of such materials, however, are very different. Therefore, it can be difficult to join such parts effectively.

Accordingly, the present disclosure is directed to an improved scarf connection for wind turbine rotor blades.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments includes at least one shell member defining an airfoil surface and an internal support structure. The first blade segment includes a beam structure extending lengthwise that structurally connects with the second blade segment. Further, the beam structure forms a portion of the internal support structure of the first blade segment. Moreover, the beam structure is formed, at least in part, of a first portion constructed of a first composite material and a second portion constructed of a different, second composite material. Further, the first and second portions are connected together via a scarf joint. In addition, the scarf joint includes a different, third composite material arranged between the first and second composite materials.

In one embodiment, the first blade segment may be constructed, at least in part, of a plurality of pultruded plates, each of the pultruded plates formed of the second composite material. In another embodiment, the third composite material may include a plurality of layers. In such embodiments, one or more of the plurality of layers may extend between one of more of the pultruded plates.

In several embodiments, ends of one or more of the plurality of layers may extend between the first and second composite materials at an angle with respect to the plurality of pultruded plates. In such embodiments, the angle may range from about 90 degrees to about 180 degrees. In addition, one or more of the plurality of layers may define at least one bend that is arranged between the first and second composite materials.

In further embodiments, the first, second, and third composite materials may include a thermoset resin or a thermoplastic resin. In addition, the first, second, and/or third material may be reinforced with one or more fiber materials. In such embodiments, the fiber material(s) may include glass fibers, carbon fibers, polymer fibers, wood fibers, bamboo fibers, ceramic fibers, nanofibers, metal fibers, or combinations thereof. In additional embodiments, the third composite material may include, for example, a composite veil material, a biax composite material, or a chopped strand mat.

In another aspect, the present disclosure is directed to a method of joining a pultruded structure of a rotor blade of a wind turbine to a composite structure of the rotor blade. The method includes arranging the pultruded structure with the composite structure at a scarf joint. The composite structure is constructed of a first composite material, whereas the pultruded structure constructed of a different, second composite material. The method also includes arranging a different, third composite material between the first and second composite materials at the scarf joint. Further, the method includes infusing the scarf joint so as to join the pultruded structure with the composite structure.

In one embodiment, the method may include forming the pultruded structure, at least in part, of a plurality of pultruded plates, each of the pultruded plates formed of the second composite material. In such embodiments, the third composite material may include a plurality of layers, therefore, the method may include placing one or more of the plurality of layers between one of more of the pultruded plates.

In another embodiment, the method may include bending ends of one or more of the plurality of layers between the first and second composite materials at an angle with respect to the plurality of pultruded plates. In such embodiments, as mentioned, the angle may range from about 90 degrees to about 180 degrees. It should be understood that the method may further include any of the additional steps and/or features as described herein.

In yet another aspect, the present disclosure is directed to a rotor blade for a wind turbine. The rotor blade includes at least one blade segment defining an airfoil surface and having an internal support structure. Further, the internal support structure is formed of at least one pultruded structure and at least one composite structure connected together at a scarf joint. The composite structure is constructed of a first composite material, whereas the pultruded structure is constructed of a different, second composite material. The scarf joint includes a different, third composite material arranged between the first and second composite materials. It should be understood that the rotor blade may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
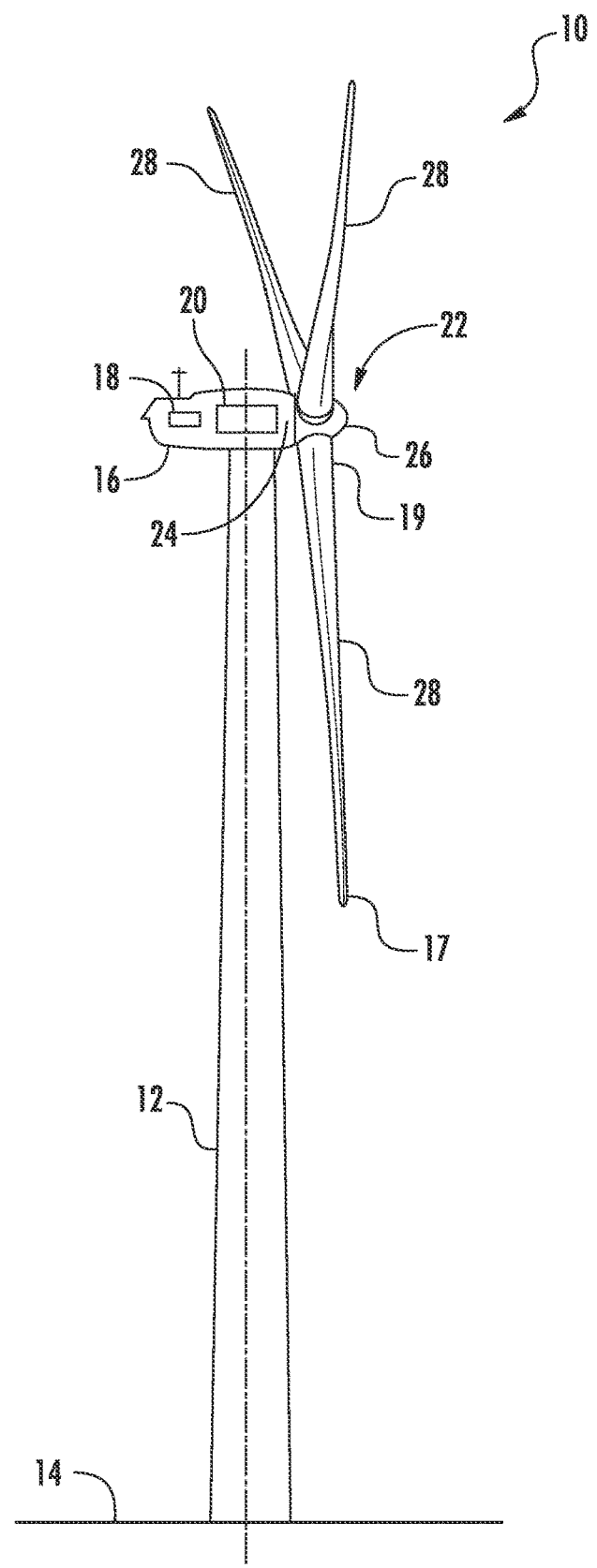
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
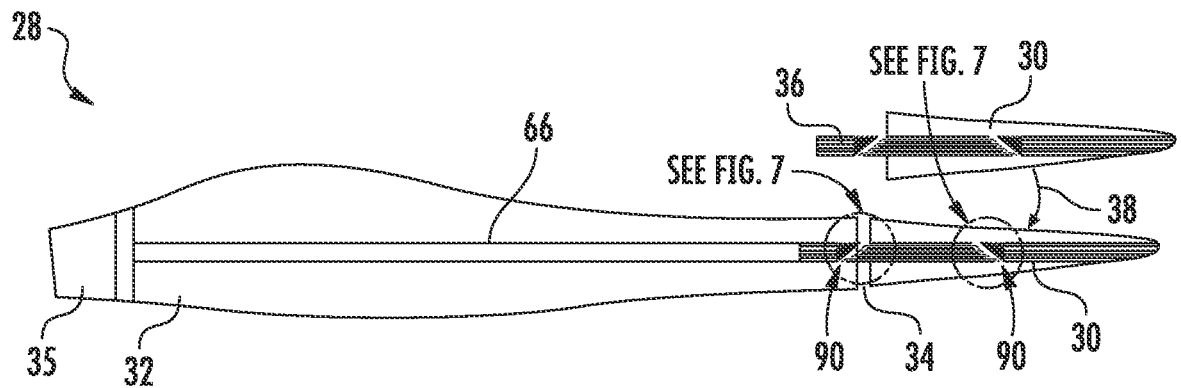
FIG. 2 illustrates a plan view of one embodiment of a rotor blade having a first blade segment and a second blade segment according to the present disclosure, particularly illustrating example locations of a scarf joint.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member defining an airfoil surface. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with a blade root section 35 of the rotor blade 28 and with the first blade segment 30. In addition, as shown, the first blade segment 30 may also include one or more scarf joints 90 at an interface of one or more pultrusions (e.g. pultruded components or plates) and a composite structure as discussed in more detail with respect to FIGS. 7 and 8.

Figure 3:
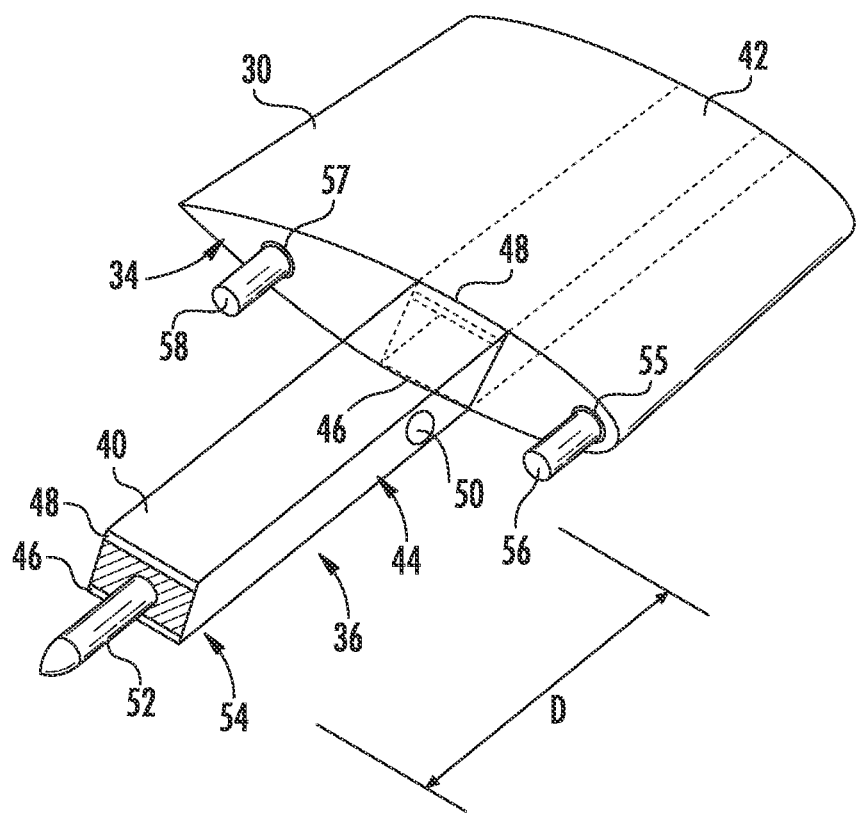
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 includes a shear web 44 connected with a suction side spar cap 46 and a pressure side spar cap 48. As such, the scarf joints 90 described herein may be part of the beam structure 40.

Moreover, as shown, the first blade segment 30 may include one or more first pin joints towards a first end 54 of the beam structure 40. In one embodiment, the pin joint may include a pin that is in a tight interference fit with a bushing. More specifically, as shown, the pin joint(s) may include one pin joint tube 52 located on the beam structure 40. Thus, as shown, the pin joint tube 52 may be oriented in a span-wise direction. Further, the first blade segment 30 may also include a pin joint slot 50 located on the beam structure 40 proximate to the chord-wise joint 34. Moreover, as shown, the pin joint slot 50 may be oriented in a chord-wise direction. In one example, there may be a bushing within the pin joint slot 50 arranged in a tight interference fit with a pin joint tube or pin (shown as pin 53 in FIG. 6). Further, the first blade segment 30 may include multiple second pin joint tubes 56, 58 located at the chord-wise joint 34. Thus, as shown, the second pin joint tubes 56, 58 may include a leading edge pin joint tube 56 and a trailing edge pin joint tube 58. Further, each of the second pin joint tubes 56, 58 may be oriented in a span-wise direction. In addition, as shown, each of the second pin joint tubes 56, 58 may include multiple flanges 55, 57, respectively, that are configured to distribute compression loads at the chord-wise joint 34.

It is to be noted that the pin joint tube 52 located at the first end of the beam structure 40 may be separated span-wise with the multiple second pin joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the pin joints connecting the first and second blade segments 30, 32 may include an interference-fit steel bushed joint.

Figure 4:
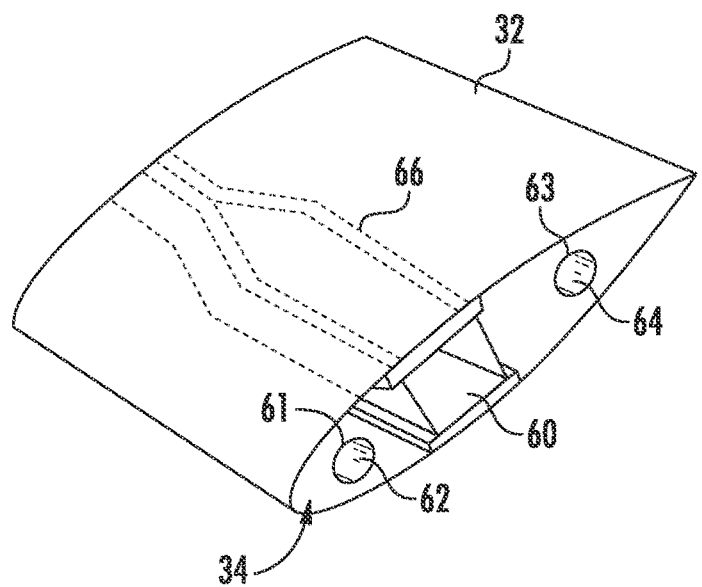
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. The receiving section 60 includes the spar structures 66 that extend lengthwise for connecting with the beam structure 40 of the first blade segment 30. As shown, the second blade segment 32 may further include pin joint slots 62, 64 for receiving pin joint tubes 56, 58 (shown in FIG. 3) of the first blade segment 30 and forming tight interference fittings. In one example, each of the multiple pin joint slots 62, 64 may include multiple flanges 61, 63, respectively, that are configured to distribute compression loads at the chord-wise joint 34.

Figure 5:
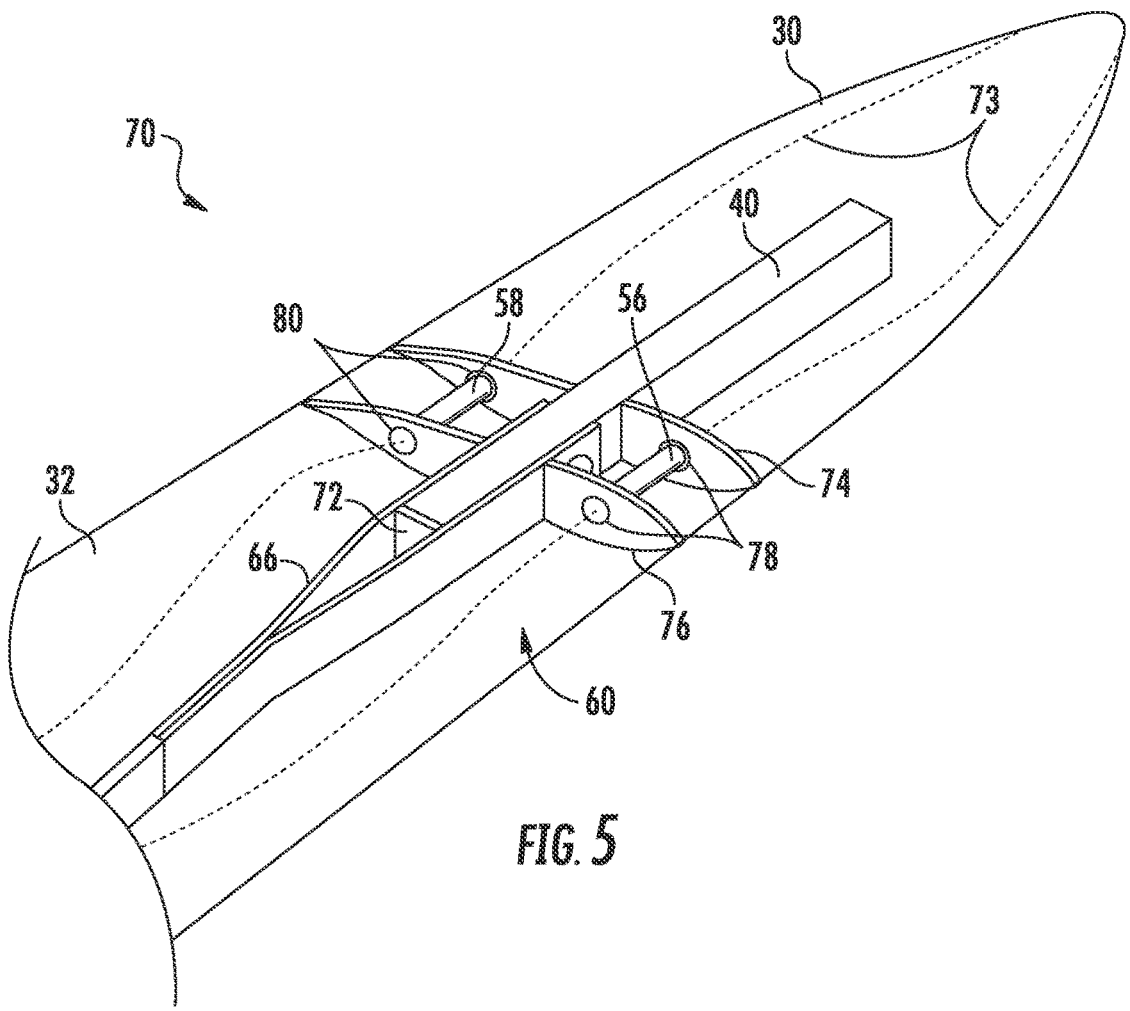
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple spar structures 66 extending lengthwise and supports the beam structure 40. The receiving section 60 also includes a rectangular fastening element 72 that connects with the pin joint tube 52 of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge pin openings 78 and trailing edge pin openings 80 that allows pin joint connections between the first and second blade segments 30, 32. For example, as shown, the chord-wise members 74, 76 are connected by pin joint tubes 56 and 58 that are in tight interference fit with bushings located in the leading edge pin openings 78 and the trailing edge pin openings 80. In another embodiment, each of the spar structures 66, the rectangular fastening element 72, and the chord-wise members 74, 76 may be constructed of glass reinforced fibers. In this example, the assembly 70 may also include multiple lightening receptor cables 73 that are embedded between the multiple pin joint tubes or pins 56, 58 and the bushing connections attached to the chord-wise members 74, 76.

Figure 6:
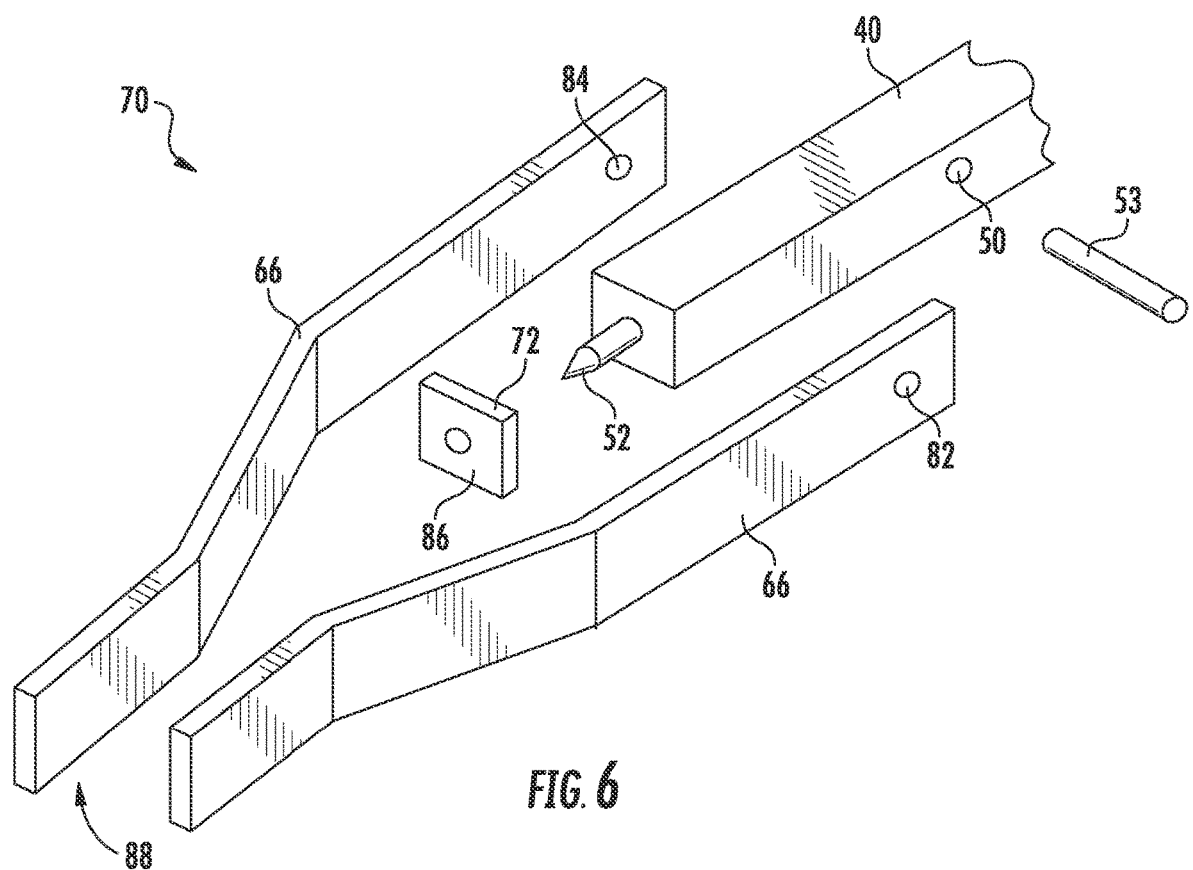
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, a pair of spar structures 66 is configured to receive the beam structure 40 and includes pin joint slots 82, 84 that are aligned with the pin joint slot 50 of the beam structure 40 through which a pin joint tube or pin 53 may be inserted. Further, the pin 53 is configured to remain in a tight interference fit within the aligning pin joint slots 82, 50, 84 such that spar structures 66 and the beam structure 40 are joined together by during assembling. Further, FIG. 6 also illustrates the rectangular fastening element 72 that includes a pin joint slot 86 configured for receiving the pin joint tube 52 of the beam structure 40. As such, the pin joint tube 52 is configured to form a tight interference fit bolted joint. Further, the pair of spar structures 66 may be joined together at one end 88 using any suitable adhesive material or an elastomeric seal.

Figure 7:
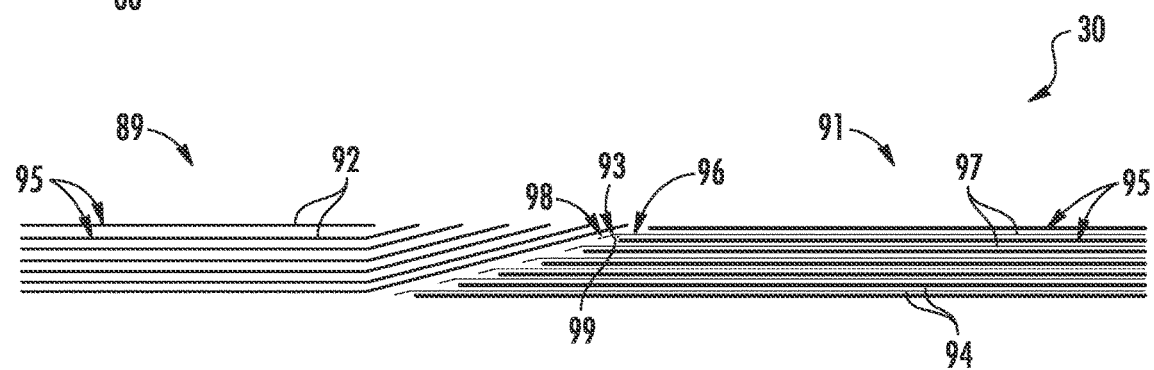
FIG. 7 illustrates a detailed, plan view of one embodiment of a scarf joint between one or more spar structures of the rotor blade and a blade segment of the rotor blade according to the present disclosure.

Referring to FIG. 7, a detailed, plan view of one embodiment of the connection between one or more pultruded parts 95 and an adjacent composite structure of the first blade segment 30 of the rotor blade 28 of FIG. 2 is illustrated. As shown, the connection is a scarf joint 90. Further, as shown particularly in FIG. 2, the first blade segment 30 may include at least two scarf joints 90. In addition, as shown, a first portion 89 or end of the first blade segment 30 (e.g. the portion of the beam structure 40 adjacent to the pin joint tube 52 of the receiving end 54) may be constructed of a first composite material 92, whereas a second portion 91 of the first blade segment 30 may be constructed of a different, second composite material 94. Thus, as shown, the scarf joint 90 may further include a different, third composite material 96 arranged between the first and second composite materials 92, 94.

More specifically, as shown in the illustrated embodiment, the second portion 91 of the first blade segment 30 may be constructed, at least in part, of a plurality of pultruded plates 95. Thus, as shown, each of the pultruded plates 95 may be formed of the second composite material 94. Further, in such embodiments, the third composite material 96 may include a plurality of layers 97. In such embodiments, as shown, one or more of the layers 97 may extend between and beyond one the pultruded plates 95, yet shorter than an adjacent pultruded plate 95. For example, as shown, the uppermost layer 97 extends beyond the upper two pultruded plates 95 but stops before the third pultruded plate 95 (as well as the remaining plates 95 below the third plate). In addition, as shown, ends 98 of one or more of the layers 97 may extend between the first and second composite materials 92, 94 at an angle 99 with respect to the plurality of pultruded plates 95. In such embodiments, the angle 99 may range from about 90 degrees to about 180 degrees. In addition, one or more of the layers 97 may define at least one bend 93 that is arranged between the first and second composite materials 92, 94.

Figure 8:
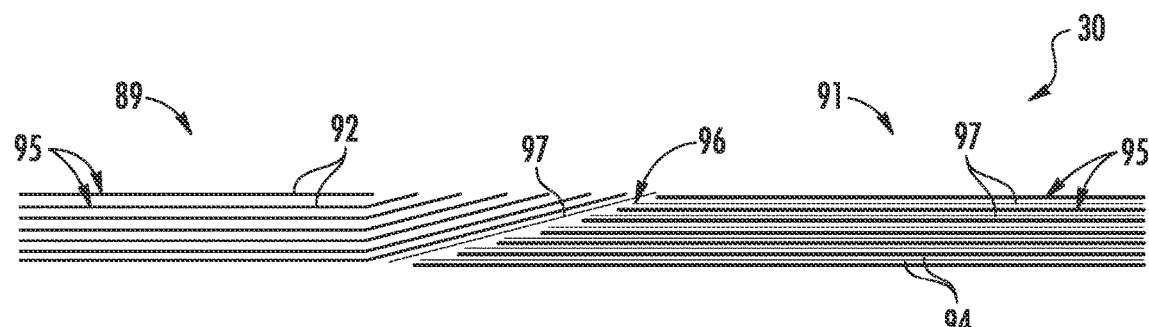
FIG. 8 illustrates a detailed, plan view of another embodiment of a scarf joint between one or more spar structures of the rotor blade and a blade segment of the rotor blade according to the present disclosure.

In another embodiment, as shown in FIG. 8, one or more of the layers 97 may extend between and beyond one the pultruded plates 95, yet shorter than an adjacent pultruded plate 95, but the angles may be absent. For example, as shown, the uppermost layer 97 extends beyond the uppermost pultruded plate 95 but stops before the second pultruded plate 95 (as well as the remaining plates 95 below the second plate). In addition, as shown, a separate, additional layer 97 of the third composite material 96 may also be arranged between the first and second composite materials 92, 94.

In further embodiments, the first, second, and third composite materials 92, 94, 96 may include a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, the first, second, and/or third material 92, 94, 96 may be reinforced with one or more fiber materials. In such embodiments, the fiber material(s) may include glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof. Thus, in certain embodiments, the third composite material 96 may include, for example, a composite veil material, a biax composite material, or a chopped strand mat.

Figure 9:
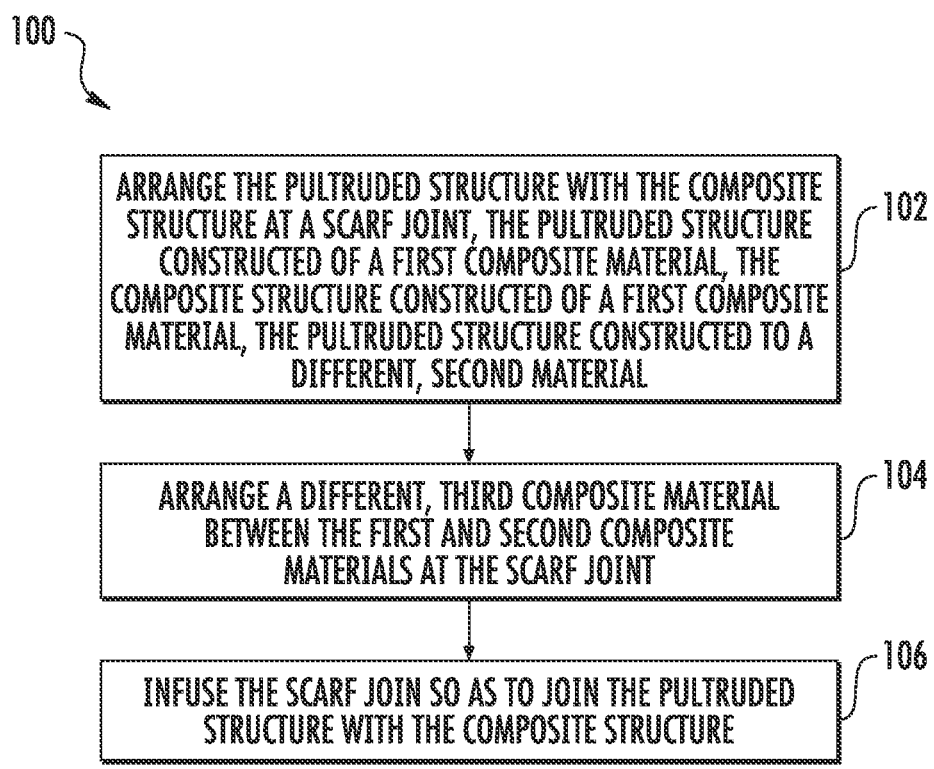
FIG. 9 illustrates a flow chart of one embodiment of a method of joining a pultruded structure of a rotor blade of a wind turbine to a composite structure of the rotor blade according to the present disclosure.

Referring now to FIG. 9, a flow chart 100 of a method of joining a pultruded structure of a rotor blade (such as a portion of the beam structure 40) of a wind turbine to a composite structure (such as another portion of the beam structure 40) of the rotor blade according to the present disclosure is illustrated. In general, the method 100 will be described herein with reference to the wind turbine 10 and the rotor blade 28 shown in FIGS. 1-8. However, it should be appreciated that the disclosed method 100 may be implemented with rotor blades having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include arranging the pultruded structure with the composite structure at a scarf joint, the composite structure constructed of a first composite material, the pultruded structure constructed of a different, second composite material. As shown at (104), the method 100 may include arranging a different, third composite material between the first and second composite materials at the scarf joint. As shown at (106), the method 100 may include infusing the scarf joint so as to join the pultruded structure with the composite structure.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
a first blade segment and a second blade segment extending in opposite directions from a chord-wise joint, each of the first and second blade segments comprising at least one shell member defining an airfoil surface and an internal support structure, the first blade segment comprising a beam structure extending lengthwise that structurally connects with the second blade segment, the beam structure forming a portion of the internal support structure of the first blade segment,
wherein the beam structure is formed, at least in part, of a first portion constructed of a first composite material and a second portion constructed of a different, second composite material, the first and second portions connected together via a scarf joint, the scarf joint comprising a different, third composite material arranged between the first and second composite minerals, wherein the second portion of the beam structure is constructed, at least in part, of a plurality of pultruded plates or components, each of the pultruded plates or components formed of the second composite material, wherein the third composite material comprises a plurality of layers, wherein each layer of the plurality of layers extends between and beyond each of the pultruded plates or components above the respective layer but stops before each of the pultruded plates or components below the respective layer, wherein the third composite material comprises an additional layer separate from the plurality of layers, wherein the additional layer is arranged between the first and second composite materials.

2. The rotor blade of claim 1, wherein ends of one or more of the plurality of layers extend between the first and second composite materials at an angle with respect to the plurality of pultruded plates or components.

3. The rotor blade of claim 2, wherein the angle ranges from 90 degrees to 180 degrees.

4. The rotor blade of claim 2, wherein one or more of the plurality of layers define at least one bend that is arranged between the first and second composite materials.

5. The rotor blade of claim 1, wherein the first, second, and third composite materials comprise at least one of a thermoset resin or a thermoplastic resin.

6. The rotor blade of claim 5, wherein at least one of the first composite material, the second composite material, and/or the third composite material is reinforced with one or more fiber materials.

7. The rotor blade of claim 6, wherein the one or more fiber materials comprise at least one of glass fibers, carbon fibers, polymer fibers, wood fibers, bamboo fibers, ceramic fibers, nanofibers, metal fibers, or combinations thereof.

8. The rotor blade of claim 5, wherein the third composite material comprises at least one of a composite veil material, a biax composite material, or a chopped strand mat.

9. A method of joining a pultruded structure of a rotor blade of a wind turbine to a composite structure of the rotor blade, the method comprising:

arranging the pultruded structure with the composite structure at a scarf joint, the composite structure constructed of a first composite material, the pultruded structure constructed of a different, second composite material;

forming the pultruded structure, at least in part, of a plurality of pultruded plates or components, each of the pultruded plates or components formed of the second composite material;

arranging a different, third composite material between the first and second composite materials at the scarf joint, wherein the third composite material comprises a plurality of layers, wherein each layer of the plurality of layers extends between and beyond each of the pultruded plates or components above the respective layer but stops before each of the pultruded plates or components below the respective layer, wherein the third composite material further comprises an additional layer separate from the plurality of layers;

placing one or more of the plurality of layers between one of more of the pultruded plates or components, wherein the additional layer is arranged between the first and second composite materials; and, infusing the scarf joint so as to join the pultruded structure with the composite structure.

10. The method of claim 9, furthering comprising bending ends of one or more of the plurality of layers between the first and second composite materials at an angle with respect to the plurality of pultruded plates or components.

11. The method of claim 10, wherein the angle ranges from 90 degrees to 180 degrees.

12. A rotor blade for a wind turbine, comprising:

at least one blade segment defining an airfoil surface and comprising an internal support structure, the internal support structure being formed of at least one pultruded structure and at least one composite structure connected together at a scarf joint, the at least one composite structure constructed of a first composite material, the at least one pultruded structure constructed of a different, second composite material, the scarf joint comprising a different, third composite material arranged between the first and second composite materials, wherein the at least one pultruded structure is constructed, at least in part, of a plurality of pultruded plates or components, each of the pultruded plates or components formed of the second composite material, wherein the third composite material comprises a plurality of layers, wherein each layer of the plurality of layers extends between and beyond each of the pultruded plates or components above the respective layer but stops before each of the pultruded plates or components below the respective layer, wherein the third composite material comprises an additional layer separate from the plurality of layers, wherein the additional layer is arranged between the first and second composite materials.

13. The rotor blade of claim 12, wherein ends of one or more of the plurality of layers extend between the first and second composite materials at an angle with respect to the plurality of pultruded plates.

14. The rotor blade of claim 12, wherein the third composite material comprises at least one of a composite veil material, a biax composite material, or a chopped strand mat.

* * * * *